US008650011B2

(12) United States Patent
Müller et al.

(10) Patent No.: US 8,650,011 B2
(45) Date of Patent: Feb. 11, 2014

(54) METHOD FOR DETERMINING AN ENGINE RESPONSE CHARACTERISTIC

(75) Inventors: Martin Müller, Commerce Township, MI (US); Jeffrey M. Pfeiffer, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 420 days.

(21) Appl. No.: 12/971,407

(22) Filed: Dec. 17, 2010

(65) Prior Publication Data
US 2012/0158374 A1    Jun. 21, 2012

(51) Int. Cl.
*G06F 7/60* (2006.01)
*G06F 17/10* (2006.01)

(52) U.S. Cl.
USPC ............................. 703/2; 703/7; 701/58

(58) Field of Classification Search
USPC ...................................................... 703/2, 6
See application file for complete search history.

(56) References Cited

U.S. PATENT DOCUMENTS

| | | | | |
|---|---|---|---|---|
| 5,714,683 | A | | 2/1998 | Maloney |
| 5,906,649 | A | * | 5/1999 | Genzel et al. ............... 701/51 |
| 5,987,398 | A | * | 11/1999 | Halverson et al. ......... 702/179 |
| 6,393,903 | B1 | | 5/2002 | Reed et al. |
| 6,980,939 | B2 | * | 12/2005 | Dhir et al. ................... 703/7 |
| 6,985,806 | B2 | * | 1/2006 | Stadler ...................... 701/102 |
| 7,139,656 | B1 | | 11/2006 | Mladenovic |
| 7,440,838 | B2 | | 10/2008 | Livshiz et al. |
| 7,472,013 | B1 | | 12/2008 | Wiggins et al. |
| 7,810,460 | B2 | | 10/2010 | Ruiz |
| 7,941,260 | B2 | * | 5/2011 | Lee et al. ..................... 701/59 |
| 2009/0049897 | A1 | * | 2/2009 | Olin et al. ................. 73/114.32 |
| 2011/0093247 | A1 | * | 4/2011 | Beauregard .................. 703/2 |

OTHER PUBLICATIONS

Guerrier et al, "The Development of Model Based Methodologies for Gasoline IC Engine Calibration", SAE Technical Paper Series 2004-01-1446, 2004.*
Bin Wu and Zoran S. Filipi; "Using Neural Networks to Compensate Altitude Effects on the Air Flow Rate in Variable Valve Timing Engines"; 2005-01-0066; pp. 1-15, Apr. 2005.
Lawrence Mianzo and Huei Peng; "Modeling and Control of a Variable Valve Timing Engine" pp. 554-558, Jun. 2000.
Raymond C. Turin, Rong Zhang and Man-Feng Chang; "Volumetrick Efficiency Model for Variable Cam-Phasing and Variable Valve Lift Applications" pp. 1-14, Apr. 2008.
Bin Wu, Zoran Filipi adn Dennis Assanis; "Using Artificial Neural Networks for Representing the Air Flow Rate through a 2.4 Liter VVT Engine" pp. 1-13, Oct. 2004.

* cited by examiner

*Primary Examiner* — Mary C Jacob
(74) *Attorney, Agent, or Firm* — Mark H. Svoboda

(57) ABSTRACT

A method for determining an estimate of a response characteristic that depends on a number of input factors includes developing a mathematical model of the response as a function of the input factors based on a statistical fit of a plurality of measured data points. The method also includes mapping the value of the response characteristic and the input factors at a plurality of conditions. The method combines the mapped data with the mathematical model to produce an estimate of the response characteristic that is more accurate over a range of conditions than either the mapped data or the model taken individually.

6 Claims, 3 Drawing Sheets

NOMINAL EXHAUST VALVE PHASE

US 8,650,011 B2

METHOD FOR DETERMINING AN ENGINE RESPONSE CHARACTERISTIC

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

Modern engines have an increasing number of sensors and actuators to achieve improved control. For example, an engine may incorporate Continuously Variable Valve Lift (CVVL), along with intake and exhaust valve phasing, to control the air charge introduced into a cylinder, effectively performing the function traditionally performed by the throttle valve while lowering pumping losses associated with a throttle valve. While these newer strategies offer the opportunity for improved engine control to achieve performance, efficiency, and emissions goals, the additional degrees of freedom introduced by the additional actuators complicate the engine calibration process. As the number of actuators increases, it becomes impractical to directly map the response of various engine parameters to all possible combinations of actuator settings. Even if such maps could be developed, the memory and computation requirements for the requisite look-up tables make real-time control a challenge.

As an alternative to direct mapping, a model-based approach has been proposed. In this approach, engine responses are measured over ranges of control factors, and the collected data is used to formulate a mathematical model representing the engine response to the control factors. The resulting model may be in the form of an equation that relates the engine response to the control factors. The model represents a statistical fit of the collected data, and while it may represent the general shape of the response surface relating the engine response to the control factors, the absolute accuracy of the model may be insufficient at some engine operating points.

It is desirable to provide a method for determining engine response characteristics that provides improved accuracy with lower computational demands.

BRIEF SUMMARY OF THE INVENTION

A method for determining an engine response characteristic is provided in accordance with an exemplary embodiment. This method uses data measured on an engine at a nominal condition, and then compensates for the engine not operating at the nominal condition to adjust the nominal data, using a correction obtained from a mathematical model of the engine response characteristic. The resulting estimate of the engine response characteristic has been found to be more accurate than an estimate based on the mathematical model alone, with reduced controller burden in regards to computational requirements and memory requirements for calibration tables compared to engine mapping alone.

DETAILED DESCRIPTION OF THE INVENTION

An aspect of the invention can be illustrated with respect to determining the volumetric efficiency (VE) of an engine. The volumetric efficiency is used to estimate intake airflow into an engine, and this information may be used for control of various engine actuators under both steady-state and transient engine operating conditions. According to an aspect of the invention, a method for calibrating an engine control system includes determining the volumetric efficiency of an engine by measuring the values of a plurality of input control factors and determining the value of volumetric efficiency over a range of engine speed and load conditions. By way of non-limiting example, the engine input control factors may include intake valve lift, pressure ratio (defined as the ratio of exhaust pressure to intake pressure), intake valve cam phasing, and exhaust valve cam phasing. In this portion of the engine control system calibration procedure, illustrated in FIGS. 1A through 1E, the input control factors and the resultant volumetric efficiency are referred to as "nominal" values.

Figure 1:
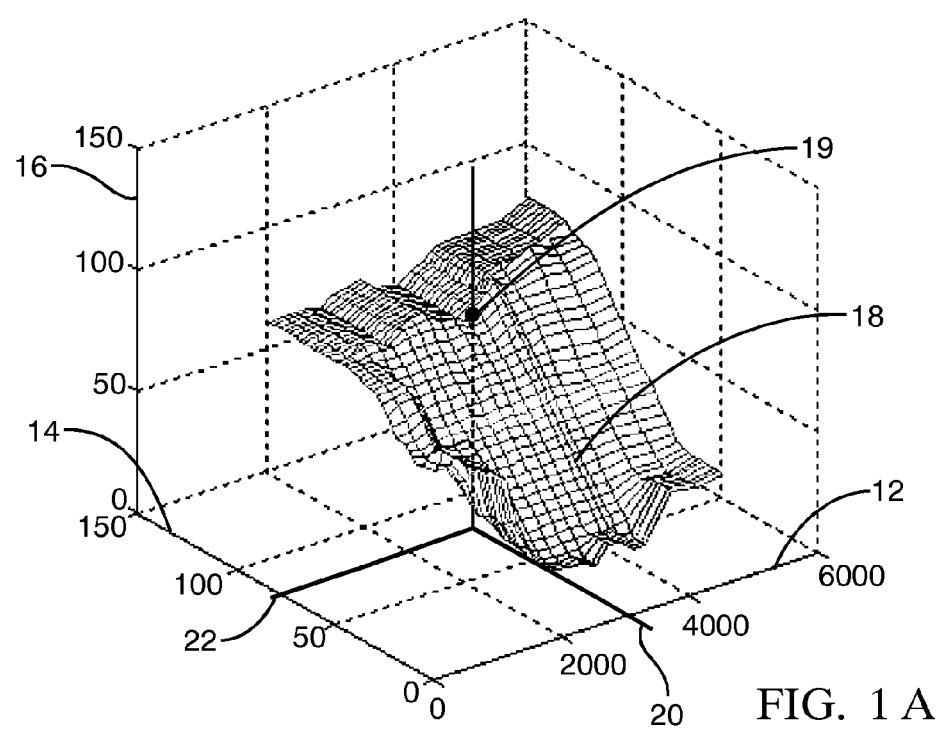
FIG. 1A is a graphical representation of the volumetric efficiency of an engine determined over a range of engine speed and load.
FIG. 1B is a graphical representation of the nominal valve lift used over the range of engine speed and load at which the volumetric efficiency shown in FIG. 1A was determined.
FIG. 1C is a graphical representation of the nominal pressure ratio used over the range of engine speed and load at which the volumetric efficiency shown in FIG. 1A was determined.
FIG. 1D is a graphical representation of the nominal inlet valve phase angle used over the range of engine speed and load at which the volumetric efficiency shown in FIG. 1A was determined.
FIG. 1E is a graphical representation of the nominal exhaust valve phase angle used over the range of engine speed and load at which the volumetric efficiency shown in FIG. 1A was determined.
Figure 1:
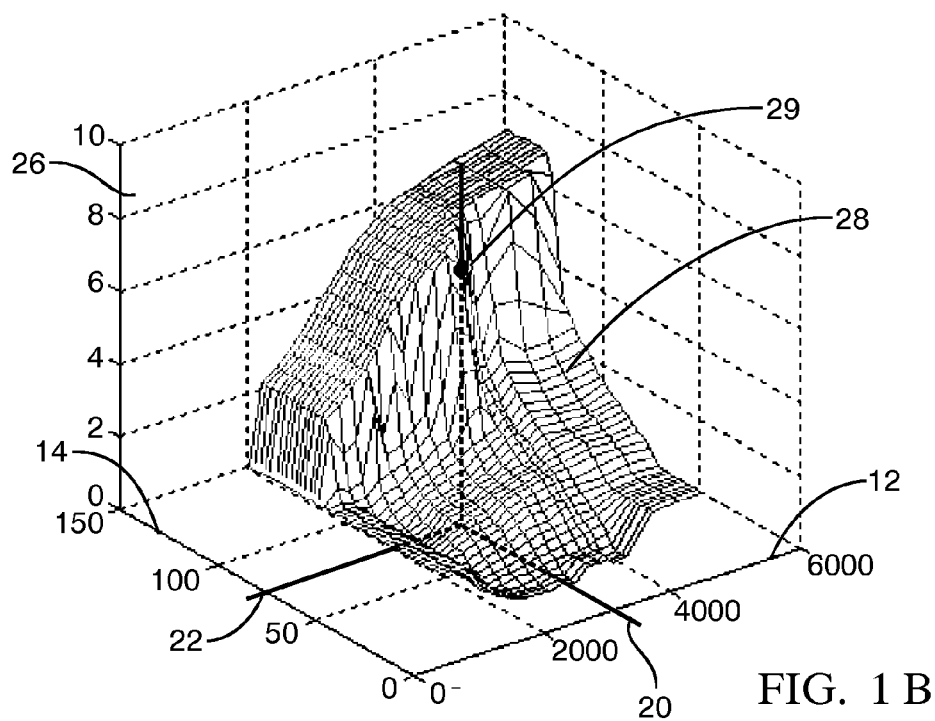
Figure 1:
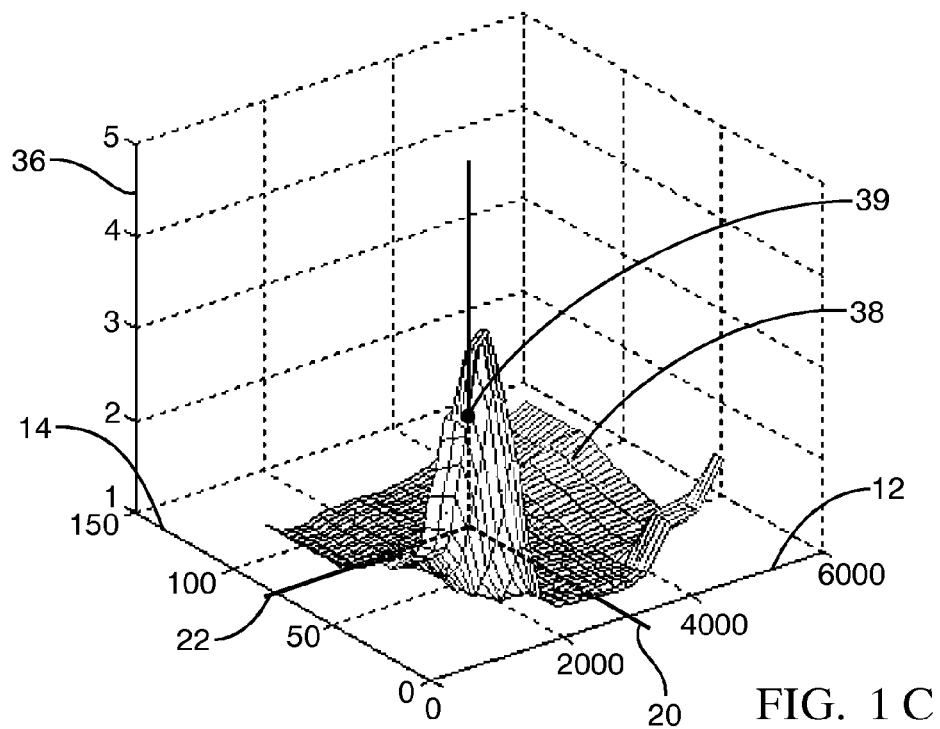
Figure 1:
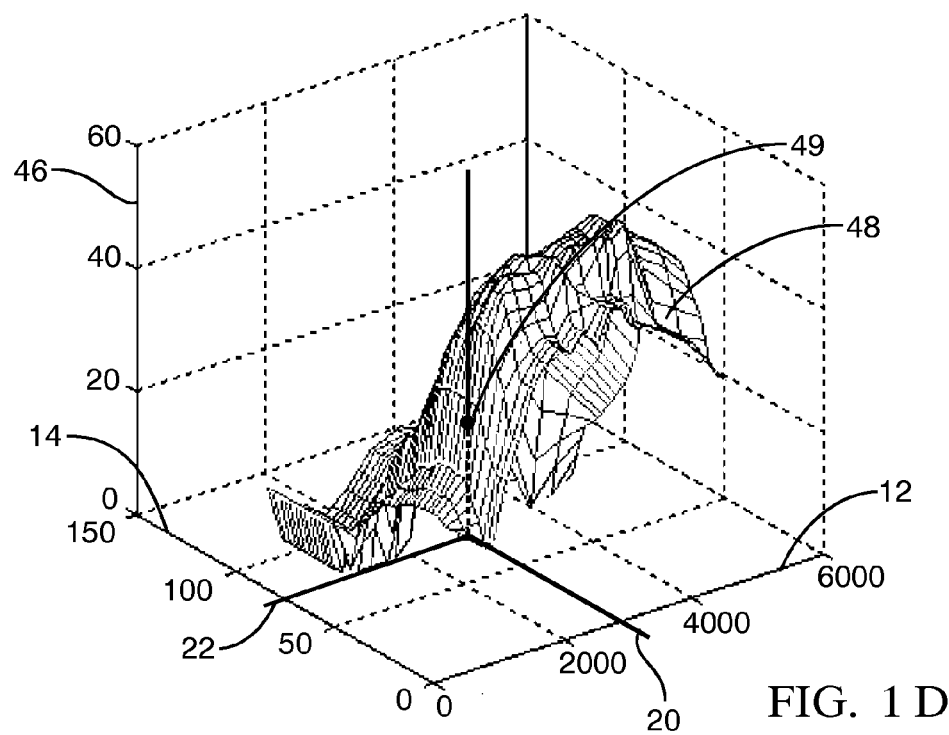
Figure 1:
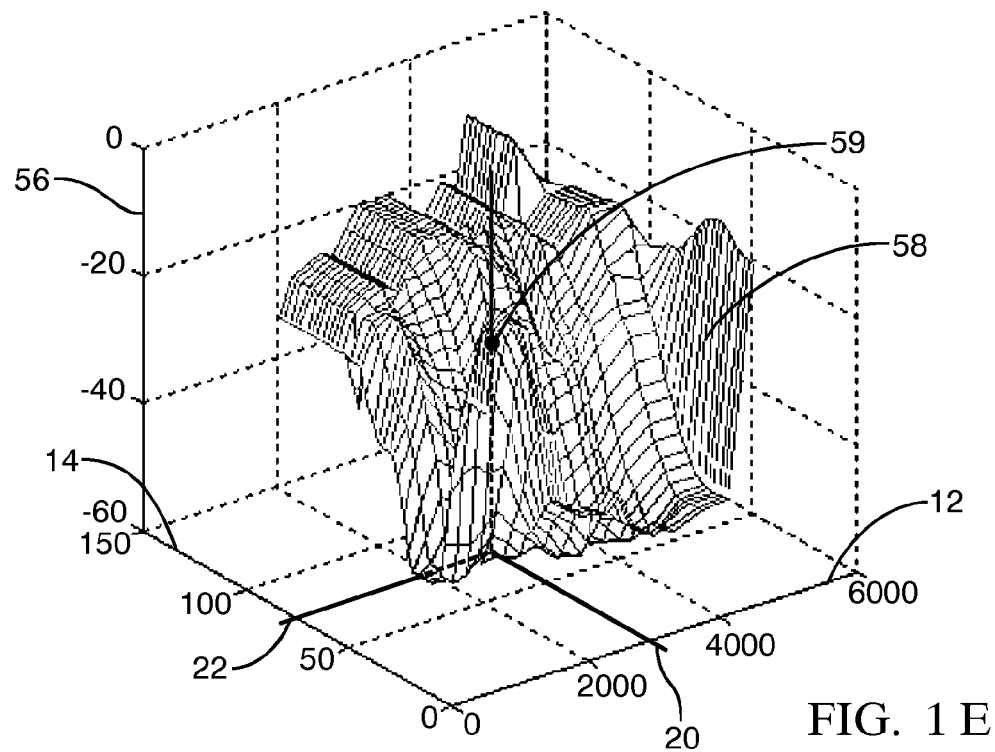

FIG. 1A is a graphical representation of the nominal volumetric efficiency of an engine determined under steady state conditions over a range of engine speed and load. FIG. 1A is presented as a three-dimensional graph, with the engine speed represented by the distance along x-axis 12 and the normalized engine load represented by the distance along y-axis 14. The nominal volumetric efficiency in FIG. 1A is represented by a height above the plane defined by x-axis 12 and y-axis 14, with z-axis 16 providing the scale for the nominal volumetric efficiency. The nominal volumetric efficiency determined over the range of speed and load can be represented by surface 18. For example, if line 20 represents a particular engine speed value and line 22 represents a particular normalized engine load value, the nominal volumetric efficiency determined at the particular speed and load may be determined by finding the intersection of lines 20 and 22 on the speed-load plane, and projecting up from that intersection to intersect surface 18 at point 19 in FIG. 1A.

Operating the engine at a particular speed and load requires setting a plurality of control inputs to given states. Desired control input states are achieved by setting actuators to desired states. The input control factor may be an actual actuator setting, or it may be an engine parameter that results from a combination of actuator settings. As part of the engine calibration method, the values of the input control factors are determined at each engine speed and load point at which the nominal volumetric efficiency as shown in FIG. 1A is determined. FIGS. 1B through 1E are graphical representations of nominal input control factors at which the engine was operated when the nominal volumetric efficiency was determined.

FIG. 1B represents the nominal input intake valve lift at each engine load and speed point at which the engine was operated as the nominal volumetric efficiency in FIG. 1A was determined. Just as in FIG. 1A, the engine speed is represented by the distance along x-axis 12, and the normalized engine load is represented by the distance along y-axis 14. The surface 28 represents the nominal intake valve lift at each point over the engine speed and load range at which the corresponding nominal volumetric efficiency was determined, with z-axis 26 providing the scale for the valve lift. For example, at the speed represented by line 20 and the load represented by line 22, the nominal valve lift can be represented by point 29 on FIG. 1B.

FIG. 1C represents the nominal pressure ratio at each engine load and speed point at which the engine was operated as the nominal volumetric efficiency in FIG. 1A was determined. Just as in FIG. 1A, the engine speed is represented by the distance along x-axis 12, and the normalized engine load is represented by the distance along y-axis 14. The surface 38 represents the nominal pressure ratio at each point over the engine speed and load range at which the corresponding nominal volumetric efficiency was determined, with z-axis 36 providing the scale for the pressure ratio. For example, at the speed represented by line 20 and the load represented by line 22, the nominal pressure ratio can be represented by point 39 on FIG. 1C.

FIG. 1D represents the nominal intake valve phase angle at each engine load and speed point at which the engine was operated as the nominal volumetric efficiency in FIG. 1A was determined. Just as in FIG. 1A, the engine speed is represented by the distance along x-axis 12, and the normalized engine load is represented by the distance along y-axis 14. The surface 48 represents the nominal intake valve phase angle at each point over the engine speed and load range at which the corresponding nominal volumetric efficiency was determined, with z-axis 46 providing the scale for the intake valve phase angle. For example, at the speed represented by line 20 and the load represented by line 22, the nominal intake valve phase angle can be represented by point 49 on FIG. 1D.

FIG. 1E represents the nominal exhaust valve phase angle at each engine load and speed point at which the engine was operated as the nominal volumetric efficiency in FIG. 1A was determined. Just as in FIG. 1A, the engine speed is represented by the distance along x-axis 12, and the normalized engine load is represented by the distance along y-axis 14. The surface 58 represents the nominal exhaust valve phase angle at each point over the engine speed and load range at which the corresponding nominal volumetric efficiency was determined, with z-axis 56 providing the scale for the exhaust valve phase angle. For example, at the speed represented by line 20 and the load represented by line 22, the nominal exhaust valve phase angle can be represented by point 59 on FIG. 1E.

The surface 18 representing nominal volumetric efficiency in FIG. 1A is accurate under steady state conditions as long as the input control factors are at the nominal conditions as represented by the surfaces 28, 38, 48, 58 in FIGS. 1B, 1C, 1D, and 1E respectively. In actual engine operation, this may not be the case. During transient operations, the input control factors may not be at the nominal conditions. Even under steady state operation, the engine may operate under conditions that are different from the nominal conditions. For example, it may be desirable to operate the engine in such a way as to increase the intake manifold vacuum to assist in evaporative canister purge or brake boost. The barometric pressure may be different than when the nominal mapping was performed. An actuator may malfunction in such a way as to make it impossible to achieve the nominal combination of conditions as depicted in FIGS. 1A through 1E. Due to the many degrees of freedom in engine control, it is impractical to directly map the volumetric efficiency at every possible combination of input control factors.

As an alternative to direct mapping, a global mathematical model can be developed relating a response characteristic such as volumetric efficiency to a plurality of engine operating parameters. To develop a global mathematical model, measurements are taken at a number of predetermined operating conditions of an engine. These measurements are then fit to a statistical model to develop an equation describing the characteristics of an engine. A non-limiting example of such an equation may be a third-order polynomial equation to model volumetric efficiency as a function of engine speed (RPM), intake valve lift (Lift), intake cam phase (IntCam), exhaust cam phase (ExhCam), and pressure ratio (PR). Such an equation may include a constant term, terms representing each input variable, terms representing the square of each input variable, terms representing the cube of each input variable, terms representing all possible products of up to three input variables, and terms representing all possible products of the square of an input variable and another input variable. The equation below illustrates terms of each of these types, where each term $a_n$ represents a constant determined in the fitting process.

$$VE_{modeled} = a_0 + a_1 \cdot RPM + a_2 \cdot Lift + a_3 \cdot IntCam +$$
$$a_4 \cdot ExhCam + a_5 \cdot PR + a_6 \cdot RPM^2 + a_7 \cdot RPM \cdot Lift + \ldots +$$
$$a_x \cdot RPM \cdot Lift \cdot IntCam + \ldots + a_y \cdot RPM^2 \cdot Lift +$$
$$a_{y+1} \cdot RPM^2 \cdot IntCam + \ldots + a_{z-1} \cdot ExhCam \cdot PR^2 + a_z \cdot PR^2$$

The inventors of the present invention have discovered that a global mathematical model for volumetric efficiency as expressed in the above equation is useful in representing general trends in how volumetric efficiency is affected by the input factors, but the model does not always represent volumetric efficiency with sufficient accuracy to achieve desired performance for real-time control of an engine. According to an aspect of the invention, the modeled results are combined with the nominal response characteristics described earlier in relation to FIGS. 1A through 1E to deliver an improved estimate of volumetric efficiency.

Figure 2:
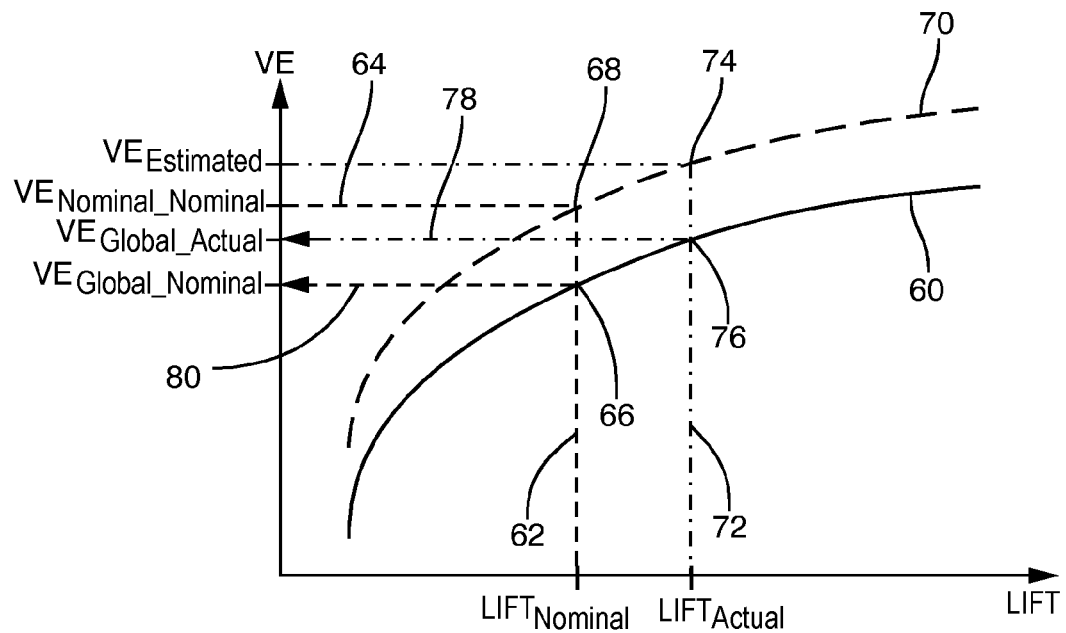
FIG. 2 is a graph illustrating calculations performed according to an aspect of the invention.

FIG. 2 illustrates aspects of the method of the present invention. Because it is difficult to illustrate an n-dimensional space as described by the global mathematical model as expressed in the equation above, FIG. 2 and the accompanying discussion is limited to estimating volumetric efficiency as a function of valve lift. It is to be understood that the invention claimed herein is not so limited. In FIG. 2, the x-axis represents valve lift and the y-axis represents volumetric efficiency. For any combination of values of the other input factors of the global model (RPM, intake cam phase, exhaust cam phase, and pressure ratio), the global mathematical model can be used to describe a relationship between volumetric efficiency and valve lift. This relationship according to the global model is indicated as curve 60 in FIG. 2. The global mathematical model can be used to predict a volumetric efficiency for any value of valve lift. In FIG. 2, line 62 represents the nominal value of valve lift used at a given engine speed and load for directly mapping volumetric efficiency as described in relation to FIGS. 1A through 1E. For example, line 62 may represent the lift denoted as point 29 in FIG. 1B, that is, the nominal valve lift at speed 20 and load condition 22. The actual nominal volumetric efficiency determined in engine mapping corresponding to this nominal valve lift represented by line 62 in FIG. 2 is the value corresponding to point 19 in FIG. 1A. This nominal volumetric efficiency may be represented by point 68 in FIG. 2.

At the lift indicated by line 62, the global mathematical model would predict a volumetric efficiency as indicated by point 66. As depicted in FIG. 2, the global mathematical model may not predict the same volumetric efficiency as determined in the nominal engine mapping described with respect to FIGS. 1A through 1E. The method of the present invention may be thought of as determining an improved estimate of volumetric efficiency by applying an offset to the modeled response characteristic to force it through a nominal point that was determined by engine mapping. As a result of applying this offset the curve 70, which has the same shape as the curve 60 describing the relationship based on the global model, is forced through point 68 which represents a nominal volumetric efficiency 64 determined at a nominal lift value 62. The curve 70 has been found to provide a more accurate estimate of volumetric efficiency than either engine mapping data or a mathematical model taken individually in the neighborhood of the engine speed and load corresponding to the nominal point 68.

As an example of an aspect of the present invention, consider an engine operating in a particular speed-load range at a valve lift value, indicated by line 72 in FIG. 2, that is different from the nominal lift value 62 used in mapping the nominal volumetric efficiency in the same speed-load vicinity. Using this value of lift in the global mathematical model would produce a volumetric efficiency estimate $VE_{Global\_Actual}$ as indicated by point 76 in FIG. 2. The nominal lift value 62 can be used in the global mathematical model to produce the value $VE_{Global\_Nominal}$ indicated by point 66. The difference between these two values, $VE_{Global\_Actual} - VE_{Global\_Nominal}$, can be thought of as the difference in volumetric efficiency resulting from the actual lift value being different from the nominal lift value. This difference can be added to the nominal volumetric efficiency value $VE_{Nominal\_Nominal}$ indicated by point 68 in FIG. 2, resulting in an improved estimate of volumetric efficiency $VE_{Estimated}$ indicated by point 74 at actual lift value 72. In the form of an equation, this calculation may be expressed as:

$$VE_{Estimated} = VE_{Nominal\_Nominal} + (VE_{Global\_Actual} - VE_{Global\_Nominal})$$

In implementing this equation it has been found beneficial to rearrange the terms to yield the modified equation:

$$VE_{Estimated} = VE_{Global\_Actual} + (VE_{Nominal\_Nominal} - VE_{Global\_Nominal})$$

or $$VE_{Estimated} = VE_{Global\_Actual} + VE_{Offset\_Raw},$$

where $$VE_{Offset\_Raw} = VE_{Nominal\_Nominal} - VE_{Global\_Nominal}$$

Brief spikes have been observed in the estimated volumetric efficiency during transient conditions. It has been found that applying a filter to the $VE_{Offset\_Raw}$ term is desirable to avoid these spikes. The equation for determining an improved volumetric efficiency estimate then becomes:

$$VE_{Estimated} = VE_{Global\_Actual} + VE_{Offset},$$

where $$VE_{Offset} = (VE_{Nominal\_Nominal} - VE_{Global\_Nominal})$$ filtered using an appropriate time constant The estimated value of volumetric efficiency that is produced by the foregoing calculations may be used to provide improved control of the actuators that influence the performance of an engine control system. The accuracy of the volumetric efficiency estimate influences the accuracy of the intake airflow estimate of the engine, which by non-limiting example may be used to control the injection time of fuel injectors to achieve a desired air-fuel ratio. Alternatively or additionally, the volumetric efficiency estimate may be used as a basis to generate a signal to a device such as an indicator lamp or a data logger.

For purposes of explaining aspects of the invention, the discussion has been limited to determining an improved estimate of volumetric efficiency based on valve lift values. It will be appreciated that this technique can be further expanded to include other input control factors in addition to or in place of valve lift. It will also be appreciated that the invention can be used to develop improved estimates of other responses that depend on a plurality of input factors besides volumetric efficiency.

In general, for an n-dimensional problem, n nominal values are determined by mapping as discussed in relation to FIGS. 1A through 1E, with one output value and (n−1) input factors. At an actual operating point, actual values for (n−1) input variables are measured. In the equation $$VE_{Estimated} = VE_{Global\_Actual} + (VE_{Nominal\_Nominal} - VE_{Global\_Nominal})$$

the term $VE_{Global\_Actual}$ represents the volumetric efficiency calculated using the mathematical model with all (n−1) input variables set to their measured actual values and $VE_{Global\_Nominal}$ represents the volumetric efficiency calculated using the mathematical model with all (n−1) input variables set to the nominal values determined during mapping.

While the embodiments of a method for estimating a response variable have been shown and described in detail, it is to be understood that the subject matter which is encompassed by the present invention is limited only by the following claims.

The invention claimed is:

1. A method comprising the steps of:
   developing a mathematical model of a response surface as a function of the values of a plurality of input variables;
   determining an actual value of a response variable at a nominal value of a first input variable;
   measuring an actual value of the first input variable;
   using the mathematical model to calculate a first modeled value of the response variable based on the measured actual value of the first input variable;
   using the mathematical model to calculate a second modeled value of the response variable based on the nominal value of the first input variable;
   calculating an estimate of the response variable by adding the actual value of the response variable measured at the nominal value of the first input variable to the first modeled value of the response variable and subtracting the second modeled value of the response variable; and
   controlling an output device based on the calculated estimate of the response variable.

2. The method of claim 1, further comprising the step of applying filtering to the difference between the first modeled value of the response variable and the second modeled value of the response variable before adding the difference to the actual value of the response variable measured at the nominal value of the first input variable.

3. The method of claim 1, wherein the response variable is the volumetric efficiency of an engine.

4. The method of claim 1, wherein the first input variable is one of intake valve lift, intake valve cam phase angle, exhaust valve cam phase angle, and pressure ratio.

5. A non-transitory computer readable medium containing computer instructions stored therein for causing a computer processor to perform the method of claim 1.

6. A system provided with a computer readable medium containing computer instructions stored therein for causing a computer processor to perform the method of claim 1, and a computer processor configured to execute the computer instructions contained on the computer readable medium.

* * * * *